United States Patent
Sanders

(10) Patent No.: US 10,836,012 B2
(45) Date of Patent: Nov. 17, 2020

(54) METHOD AND APPARATUS FOR FLUID CAVITATION ABRASIVE SURFACE FINISHING

(71) Applicant: The Boeing Company, Chicago, IL (US)

(72) Inventor: Daniel Gordon Sanders, Cle Elum, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 15/693,401

(22) Filed: Aug. 31, 2017

(65) Prior Publication Data

US 2019/0061103 A1 Feb. 28, 2019

(51) Int. Cl.

| | |
|---|---|
| *B24C 1/08* | (2006.01) |
| *B24C 1/10* | (2006.01) |
| *B05B 12/14* | (2006.01) |
| *B05B 7/10* | (2006.01) |
| *B24C 7/00* | (2006.01) |
| *B24C 1/06* | (2006.01) |
| *B08B 3/02* | (2006.01) |
| *B05B 7/14* | (2006.01) |
| *B33Y 40/00* | (2020.01) |

(52) U.S. Cl.
CPC .............. *B24C 1/08* (2013.01); *B05B 7/10* (2013.01); *B05B 7/149* (2013.01); *B05B 7/1463* (2013.01); *B05B 12/14* (2013.01); *B08B 3/028* (2013.01); *B24C 1/06* (2013.01); *B24C 1/10* (2013.01); *B24C 7/0007* (2013.01); *B33Y 40/00* (2014.12)

(58) Field of Classification Search
CPC .... B24C 1/06; B24C 1/08; B24C 1/10; B24C 7/0007; B05B 7/04; B05B 7/10; B05B 7/1463; B05B 7/149; B05B 12/14; B08B 3/028
USPC .......................................................... 451/38
See application file for complete search history.

(56) References Cited

U.S. PATENT DOCUMENTS

| | | | |
|---|---|---|---|
| 3,807,632 | A | 4/1974 | Johnson, Jr. |
| 4,342,425 | A | 8/1982 | Vickers |
| 6,280,302 | B1 | 8/2001 | Hashish et al. |
| 6,425,276 | B1 | 7/2002 | Hirano et al. |

(Continued)

FOREIGN PATENT DOCUMENTS

| | | | |
|---|---|---|---|
| CN | 106392863 A | * | 2/2017 |
| DE | 60031257 T2 | | 2/2007 |

(Continued)

OTHER PUBLICATIONS

European Patent Office, Examination Report regarding European Patent Application No. 18190086.1, dated Jul. 30, 2019, 4 pages.

(Continued)

*Primary Examiner* — Eileen P Morgan
(74) *Attorney, Agent, or Firm* — Kolisch Hartwell, P.C.

(57) ABSTRACT

A method of removing material from a surface of a workpiece includes discharging a flow of fluid towards a workpiece at a pressure and a flow rate that facilitates forming a plurality of cavitation bubbles, and introducing abrasive media. The method includes exciting the abrasive media with the cavitation bubbles, removing material from the workpiece by an interaction between the cavitation bubbles and the abrasive media, and the surface of the workpiece.

22 Claims, 6 Drawing Sheets

(56) References Cited

U.S. PATENT DOCUMENTS

| | | | |
|---|---|---|---|
| 6,855,208 B1* | 2/2005 | Soyama | B24C 1/10 134/1 |
| 6,993,948 B2 | 2/2006 | Offer | |
| 7,494,073 B2* | 2/2009 | Pivovarov | B05B 7/0416 239/428 |
| 8,833,444 B2* | 9/2014 | McAfee | E21B 7/18 166/222 |
| 9,050,642 B2 | 6/2015 | Alberts et al. | |
| 9,200,341 B1* | 12/2015 | Sanders | C21D 7/06 |
| 9,433,986 B2 | 9/2016 | Ogawa et al. | |
| 9,573,246 B2 | 2/2017 | Maeguchi et al. | |
| 9,739,695 B2 | 8/2017 | Michishita et al. | |
| 10,233,511 B1 | 3/2019 | Sanders et al. | |
| 10,265,833 B2* | 4/2019 | Sanders | B05B 15/62 |
| 2002/0098776 A1 | 7/2002 | Dopper | |
| 2005/0017090 A1* | 1/2005 | Pivovarov | B05B 7/0416 239/399 |
| 2005/0139697 A1* | 6/2005 | Pivovarov | B05B 7/0416 239/399 |
| 2006/0151634 A1* | 7/2006 | Pivovarov | B05B 7/0416 239/526 |
| 2012/0118562 A1* | 5/2012 | McAfee | E21B 7/18 166/222 |
| 2013/0284440 A1* | 10/2013 | McAfee | E21B 43/114 166/298 |
| 2019/0308292 A1* | 10/2019 | Nagalingam | E03C 1/306 |

FOREIGN PATENT DOCUMENTS

| | | |
|---|---|---|
| DE | 102006037069 A1 | 2/2007 |
| DE | 60030341 T2 | 8/2007 |
| EP | 0450222 A2 | 10/1991 |
| EP | 1500712 B1 | 8/2006 |
| EP | 1170387 B1 | 10/2006 |
| EP | 2546026 A1 | 1/2013 |
| JP | H04362124 A | 12/1992 |
| JP | 2003062492 A | 3/2003 |
| JP | 4240972 B2 | 3/2009 |
| JP | 2011-245582 A | 12/2011 |
| JP | 5578318 B2 | 8/2014 |
| JP | 5876701 B2 | 3/2016 |
| JP | 2016221650 A | 12/2016 |
| WO | 2016131483 A1 | 8/2016 |

OTHER PUBLICATIONS

Soyama, et al., Use of Cavitating Jet for Introducing Compressive Residual Stress, Article in Journal of Manufacturing Science and Engineering, vol. 22, Feb. 2000, 7 pages.

Turski, et al., Engineering the residual stress state and microstructure of stainless steel with mechanical surface treatments, Article for Springer-Verlag, May 11, 2010, 8 pages.

Sato, et al., Using Cavitation Peening to Improve the Fatigue Life of Titanium Alloy Ti—6A1—4V Manufactured by Electron Beam Melting, Article for Scientific Research Publishing, Apr. 20, 2016, 11 pages.

Marcon, Andrea, Water Cavitation Peening for Aerospace Materials—A Dissertation Presented to the Academic Facuity at the Georgia Institute of Technology, Jan. 2017, 211 pages.

Tan, K.L., et al. Surface Modification of Additive Manufactured Components by Ultrasonic Cavitation Abrasive Finishing, Wear, 378-379, 2017, 90-95 pg, Singapore.

European Patent Office, Extended European Search Report in European Patent Application No. 18190086.1-1019, dated Feb. 5, 2019, 7 pages.

U.S. Patent and Trademark Office, Office action regarding U.S. Appl. No. 15/693,409, dated May 30, 2018, 11 pages.

U.S. Patent and Trademark Office, Office action regarding U.S. Appl. No. 15/693,417, dated May 30, 2018, 10 pages.

European Patent Office, Extended European Search Report in European Patent Application No. 18189818.0, dated Feb. 6, 2019, 10 pages.

European Patent Office, Extended European Search Report in European Patent Application No. 18190518.3, dated Feb. 6, 2019, 12 pages.

European Patent Office, Examination Report regarding European Patent Application No. 18189818.0, dated Oct. 24, 2019, 4 pages.

European Patent Office, Communication Pursuant to Article 94(3) EPC regarding European Patent Application No. 18190086.1, dated May 7, 2020, 4 pages.

* cited by examiner

METHOD AND APPARATUS FOR FLUID CAVITATION ABRASIVE SURFACE FINISHING

FIELD

This disclosure relates to surface finishing. More specifically, the disclosed embodiments relate to systems and methods for subtractive material finishing, cleaning, and peening with a cavitated fluid.

INTRODUCTION

Additive manufacturing methods such as directed energy deposition and powder bed melting have enabled efficient manufacturing of new components with complex shapes and features which are not practical or feasible to manufacture by previous methods. However, the resulting surface finish on products made by additive manufacturing is rougher than parts produced by traditional manufacturing methods. Electron beam powder bed melting can create a surface roughness average (Ra) over 1,000 µM, which is more than 10 times the smooth finish required for typical structural airplane components. Machining is cost-prohibitive or not possible for complex additive manufactured components, and surface finishing methods such as grit blasting, chemical milling, and shot peening do not sufficiently improve the surface roughness.

Cavitation peening is a promising new method of mechanically treating a surface. Cavitation bubbles are formed in a fluid by a transition to gas phase resulting from an increase in flow velocity, then collapse as the flow velocity decreases. When a cavitation bubble collapses, a micro-jet is produced that can have a speed of 1,500 m/s in some examples. As disclosed in Soyama U.S. Pat. No. 6,855,208 B1, injecting a high speed water jet, or cavitating jet into water produces a cavitation cloud. The cavitation bubbles move in a vortex and the multi-directional impacts of the resultant micro-jets harden a surface better than shot peening. However, while cavitation peening cleans and enhances fatigue strength, surface roughness is not improved sufficiently for many applications.

SUMMARY

A method of removing material from a surface of a workpiece is disclosed. The method includes discharging a flow of fluid towards a workpiece at a pressure and a flow rate that facilitates forming a plurality of cavitation bubbles, then introducing abrasive media in or around the bubbles. The method may include forming a mixture of the cavitation bubbles and the abrasive media, then directing the mixture toward the surface of the workpiece. The method includes exciting the abrasive media with the cavitation bubbles, removing material from the workpiece by an interaction between the cavitation bubbles, the abrasive media, and the surface of the workpiece.

An apparatus for removing material from a workpiece is also disclosed. The apparatus includes a fluid flow device and an abrasive media dispensing device. The fluid flow device is configured to pump fluid through a nozzle to generate a plurality of cavitation bubbles. The abrasive media dispensing device is configured to deliver abrasive media into the cavitation bubbles.

The present disclosure provides a method and an apparatus for removing material from a workpiece. In some embodiments, the method may include forming a plurality of cavitation bubbles and introducing abrasive media into the bubbles. In some embodiments, the method may include forming a mixture of cavitation bubbles and abrasive media. In some embodiments, the apparatus may include a fluid flow device and an abrasive media dispensing device. Features, functions, and advantages may be achieved independently in various embodiments of the present disclosure, or may be combined in yet other embodiments, further details of which can be seen with reference to the following description and drawings.

DESCRIPTION

Overview

Various embodiments of a surface finishing method and apparatus having a fluid flow device and abrasive media are described below and illustrated in the associated drawings. Unless otherwise specified, a surface finishing apparatus and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other surface finishing apparatuses. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1A:
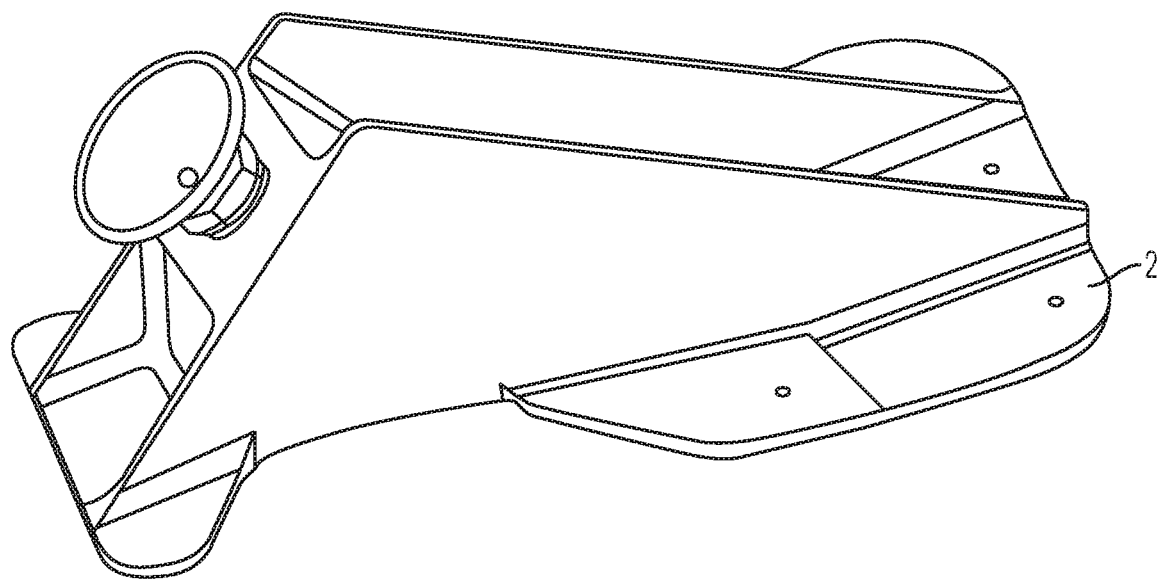
FIG. 1a is an isometric view of a jet engine nacelle compression pad created by a machining process.
Figure 1B:
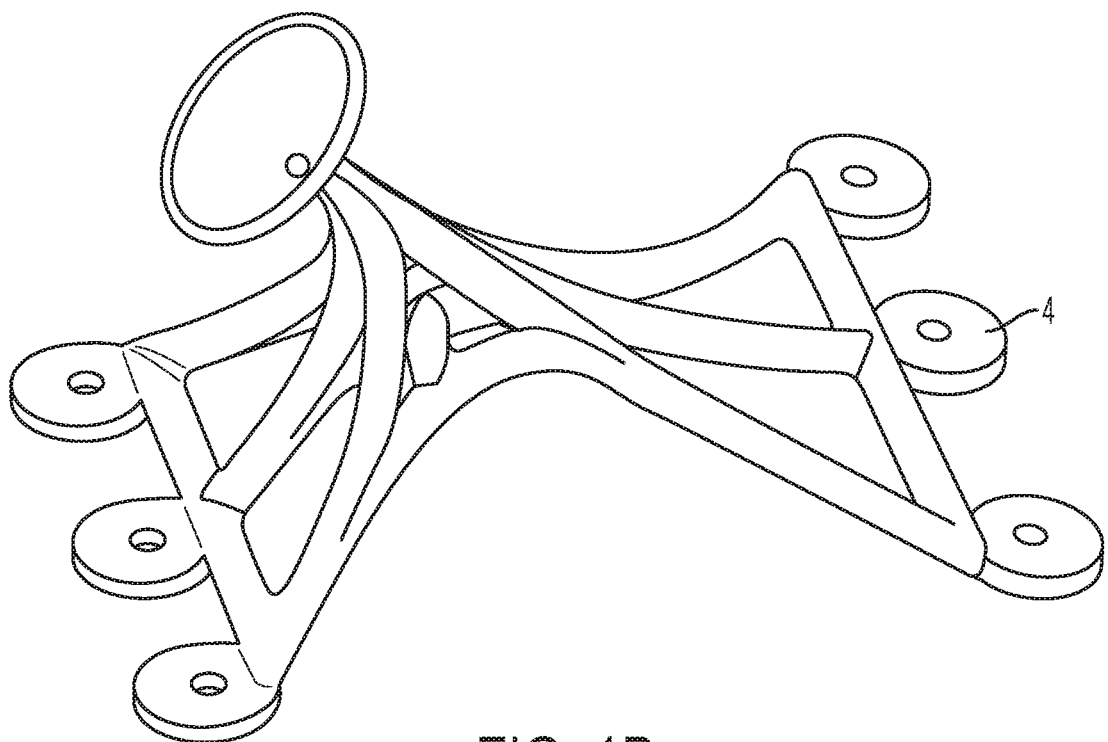
FIG. 1b is an isometric view of a jet engine nacelle compression pad created by an additive manufacturing process.

FIG. 1a shows a jet engine nacelle compression pad 2 made by machining a block of titanium. Raw material for the pad may weigh about 15 pounds, while the pictured finished component may weight only 1.5 pounds. By contrast, FIG. 1b shows a compression pad 4 for the same jet engine nacelle, produced by additive manufacturing. All raw material may be used in this design, and the design flexibility may allow a more structurally efficient configuration.

However, as built, the compression pad shown in FIG. 1b is not acceptable for use as a structural part in an engine. The additive manufacturing process produces a surface roughness average (Ra) of over 1,000 µM. It should be noted that the compression pad has been designed with such complexity that machining may be cost prohibitive or even impossible.

The improvement in manufacturing efficiency and design freedom offered by additive manufacturing is highly desirable across a wide range of disciplines, to reduce costs and enable new technologies. Surface roughness is a major obstacle to the adoption of such techniques, which may be overcome by fluid cavitation abrasive surface finishing.

Examples, Components, and Alternatives

The following sections describe selected aspects of exemplary apparatuses for removing material from a workpiece as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 2:
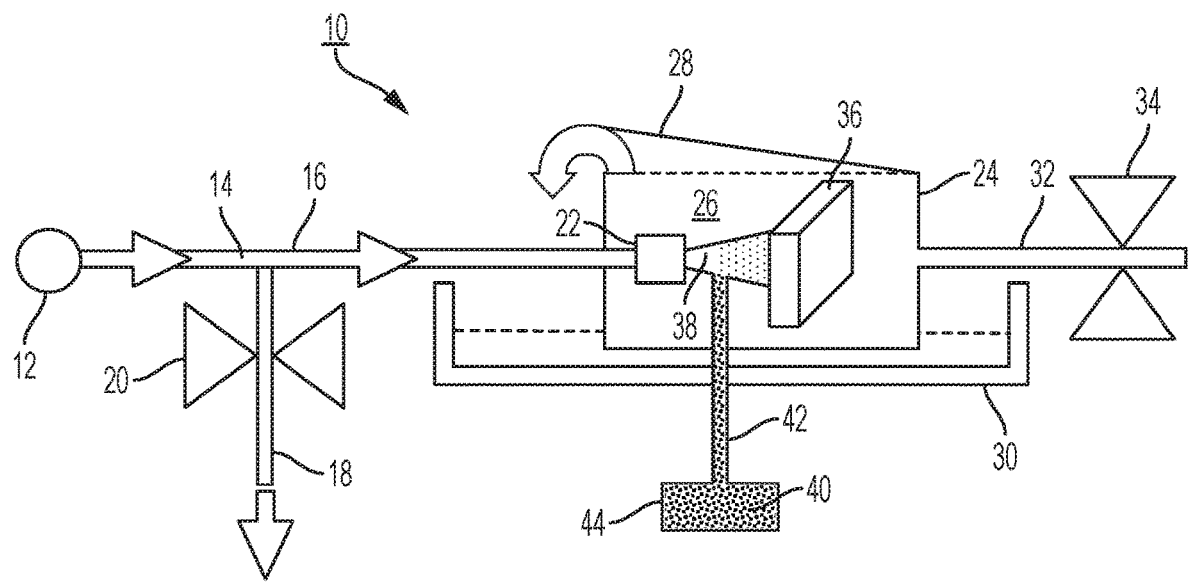
FIG. 2 is a block diagram of an example of a fluid cavitation abrasive surface finishing apparatus.

FIG. 2 is a block diagram of an exemplary apparatus for fluid cavitation abrasive surface finishing, generally indicated at 10. A high-pressure pump 12 supplies pressurized water 14 along a conduit 16. A branching conduit 18 is regulated by a control valve 20. Such placement of the control valve allows precise control of the pressure and flow rate of water supplied along conduit 16 to a nozzle 22.

Nozzle 22 is disposed in a pressurized tank 24 filled with water 26. Lid 28 of tank 24 may open to allow overflow from the tank into a catchment container 30. The lid may be coupled to tank 24 by a spring, or may be constrained by a weight, in order to maintain pressure in the tank. Water also drains from tank 24 along a conduit 32, regulated by a control valve 34.

High pressure water 14 is injected by nozzle 22 into water 26 of tank 24 as a cavitating jet, which is directed toward a workpiece 36 submerged in tank 24. An interaction between the cavitating jet and water 26 form a swirling cavitation cloud 38, including a plurality of cavitation bubbles. Workpiece 36 may be disposed such that cavitation cloud 38 surrounds some or all of the workpiece, and collapsing cavitation bubbles impact a surface of the workpiece. The collapsing impact force of a cavitation bubble is determined in part by the pressure of injected water 14, the pressure of water 26 in tank 24, the ratio between the two pressures, and the temperature of water 14 and water 26 of tank 24. High pressure water 14 may be between 50 and 10,000 pounds per square inch, or any effective pressure. Preferably, water 14 may be at approximately 4,000 pounds per square inch when water 26 of tank 24 is at atmospheric pressure.

To optimize these parameters, a pressure and temperature sensor may be included in tank 24, or in any of conduits 12, 18, or 32. Control valves 20, 34 and lid 28 as well as high pressure pump 12 and a temperature control system may be connected to an electronic controller or other such component to allow precise, coordinated control of pressure and temperature conditions throughout apparatus 10.

In the pictured example, the cavitated fluid is water. However, any desired fluid may be used. Properties such as viscosity of the fluid used may affect collapsing force of cavitation bubbles and a fluid may be chosen to improve impact, or decrease the pressure required for a desired impact level. Any effective fluid flow device may be used to pump pressurized fluid through nozzle 22.

As shown in FIG. 2, an abrasive media 40 is introduced into cavitation cloud 38 between nozzle 22 and workpiece 36. The abrasive media is supplied by a conduit 42 from a hopper, or abrasive media source 44. An example of source 44 is shown in more detail in FIG. 3. The source includes a sealed compartment 46 with multiple hoppers 48, each hopper housing a different type of abrasive media or abrading material. In the pictured example, compartment 46 includes 6 hoppers with 6 abrasive media of decreasing grit size. Source 44 may include any desired types of media or number of types of media. The media may be of any grit size, preferably within a range of approximately 16 to 1200 ANSI grit size.

Each hopper 48 includes a hopper door 50 that may be opened to introduce the desired media into conduit 42. Door 50 may be controlled manually, or may be actuated by an electronic controller integrated with other components of apparatus 10. Other simple switching mechanisms exist that may transition between delivery of different media, and any effective mechanism may be used.

An air hose 52 is connected to source 44 to pressurize sealed compartment 46. Abrasive media 40 may thereby flow more freely and easily, and be urged into and along conduit 42. In some examples, water or another fluid may be used in place of air to pressurize sealed compartment 46. In other examples, a mechanism such as a push-rod may be used to induce abrasive media 40 to move through conduit 42. The abrasive media may be loose or may be in the form of a paste, or suspension.

Figure 4:
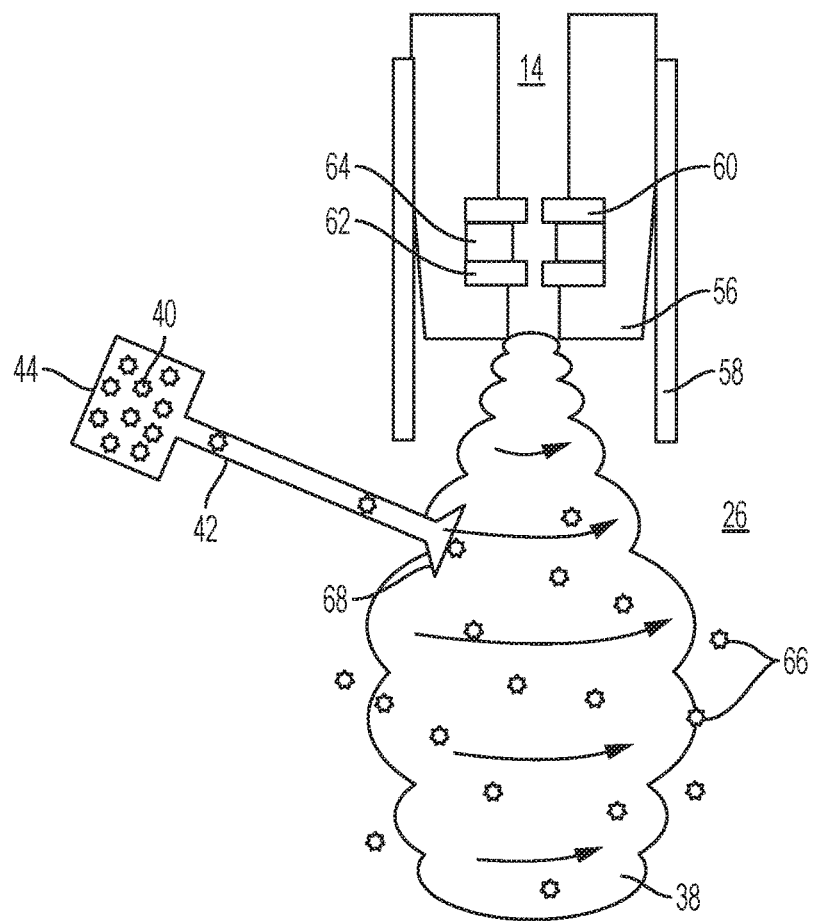
FIG. 4 is a diagrammatic illustration of the creation of an abrasive cavitation cloud, by an apparatus of the type shown in FIG. 2.

Conduit 42 also includes a corkscrew structure 54, to induce a rotational or swirling motion to the media before the media is introduced to cavitation cloud 38, as shown in FIG. 4. In some examples, conduit 42 may be rotated other otherwise moved relative to cavitation cloud 38 while abrasive media 40 is being introduced to the cloud.

Nozzle 22 is show in more detail in FIG. 4, including a nozzle cap 56 disposed in a guide pipe 58. A cavitator 60 is spaced from a nozzle plate 62 by spacer 64, and positioned in nozzle cap 56 to alter flow of high pressure water 14 through nozzle 22. The change in flow rate of water 14 and interaction with tank water 26 may result in cavitation cloud 38. The plurality of cavitation bubbles comprising the cloud may swirl in a vortex, or tornado-like shape.

Figure 3:
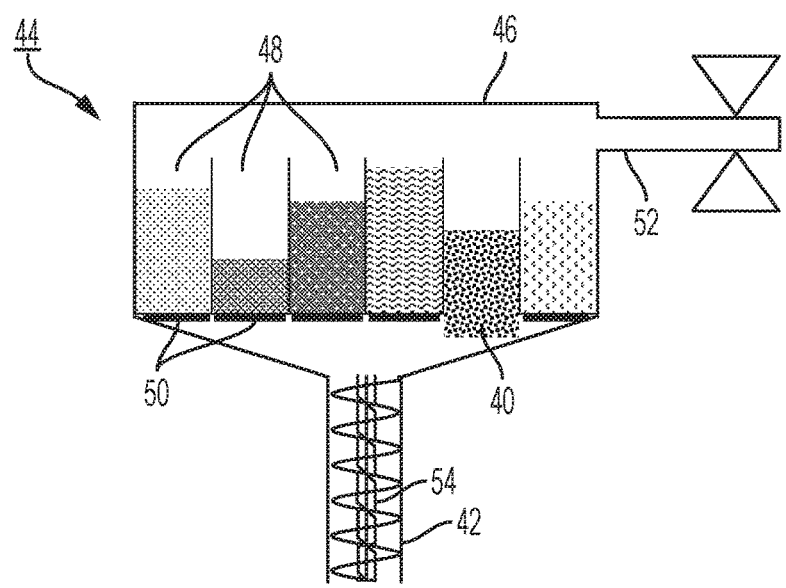
FIG. 3 is a diagrammatic illustration of an example of an abrasive media source.

Conduit 42 from abrasive media source 44 introduces a plurality of particles 66 of abrasive media 40 into cavitation cloud 38. Abrasive media 40 may gain speed, momentum, and kinetic energy from the cavitation cloud and mix with the cavitation bubbles. In the pictured example, abrasive media 40 is introduced by a wide-angle nozzle 68, having at least a portion of outwardly diverging surfaces, at a distal end of conduit 42. As shown in FIG. 3, abrasive media 40 is rotated by corkscrew 54 to facilitate mixing with cavitation cloud 38. Wide-angle nozzle 68 is disposed proximate an end of guide pipe 58 to saturate the greatest possible portion of cavitation cloud 38 with abrasive media 40.

In other examples, abrasive media 40 may be fed into cavitation cloud 38 by multiple conduits that are disposed at locations distributed around the cloud. In FIG. 4, nozzle 68 is shown oriented at an acute angle relative an axis defined by guide pipe 58. In other examples, nozzle 68 may be oriented perpendicular the axis or at an oblique angle. Any type of nozzle may be used with conduit 42. Source 44 may also include any appropriate delivery system or dispensing device for the abrasive media being used in apparatus 10.

In the pictured example, abrasive media 40 is introduced at an edge of cavitation cloud 38, into the swirling cavitation bubbles. In other examples, abrasive media 40 may be introduced near a center of cavitation cloud 38, or into water 26 of tank 24 just outside of cavitation cloud 38, or at any point that promotes effective mixing of the abrasive media and the cavitation bubbles.

Figure 5:
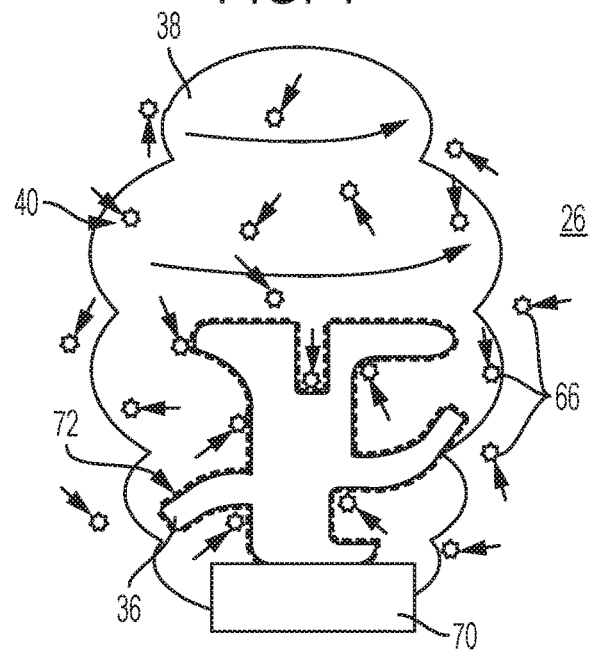
FIG. 5 is a diagrammatic illustration of a workpiece undergoing surface finishing in the abrasive cavitation cloud of FIG. 4.

FIG. 5 shows workpiece 36 supported by a stage 70, in a swirling mixture of cavitation bubbles and abrasive media 40. Nozzle 22, not shown in FIG. 5, may be directed toward stage 70. As the bubbles of the mixture collapse, particles 66 of the media may be excited and energized. The micro-jets created by collapsing bubbles may collectively accelerate the motion of particles 66. As the mixture of bubbles and media contacts a rough surface 72 of workpiece 36, particles 66 may impact the surface and remove material. That is, abrasive media 40 may be acted on by the high forces of the cavitation cloud to smooth rough surface 72. The swirling and multi-directional motion of cavitation cloud 38 may bring abrasive media 40 into contact with tight corners, crevices, and internal features of surface 72 as well as exposed upper areas.

Normal cavitation peening may also occur, as the cavitation bubbles interact directly with surface 72 of workpiece 36. Surface 72 may be thereby peened, improving residual stress and fatigue strength, and cleaned, ready for painting or use.

Example 2

Figure 6:
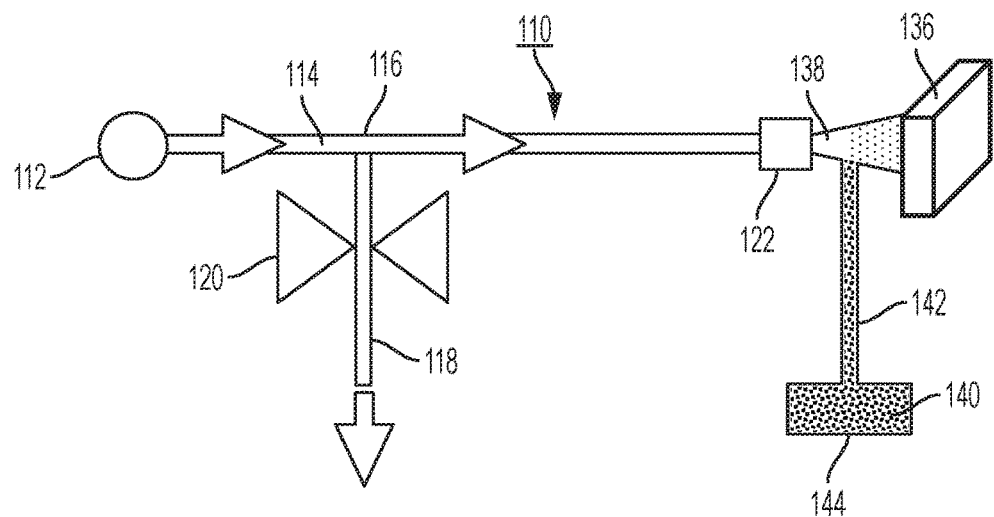
FIG. 6 is a block diagram of another example of a fluid cavitation abrasive surface finishing apparatus.

FIG. 6 is a block diagram of another exemplary apparatus for fluid cavitation abrasive surface finishing, generally indicated at 110. Components similar to apparatus 10 as described above, are labeled with corresponding reference numbers. As shown, high-pressure pump 112 supplies pressurized water 114 along a conduit 116 to a nozzle 122. A branching conduit 118 is regulated by a control valve 120.

Nozzle 122 is directed toward a workpiece 136 that is disposed in an air environment. The nozzle delivers two streams of water, a high pressure inner cavitation jet and a lower pressure outer jet. A cavitation cloud 138 may be thereby generated by nozzle 22, which may be referred to as a co-flow nozzle.

Figure 7:
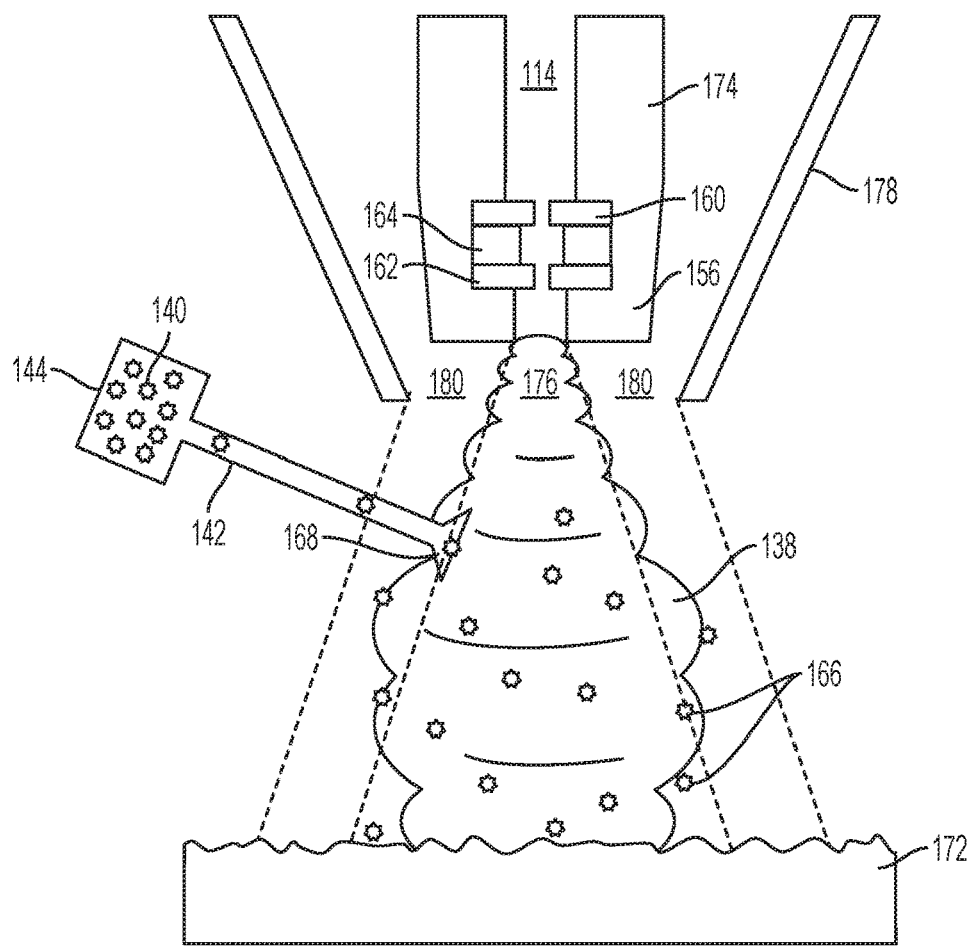
FIG. 7 is a diagrammatic illustration of a surface undergoing finishing by an apparatus of the type shown in FIG. 6.

Abrasive media 140 is introduced into cavitation cloud 138 between nozzle 122 and workpiece 136. The abrasive media is supplied by a conduit 142 from a source 144. FIG. 7 illustrates in more detail the resultant mixture of cavitation bubbles and abrasive media 140.

As shown in FIG. 7, co-flow nozzle 122 includes an inner nozzle 174 to generate inner cavitating jet 176 and an outer nozzle 178 to generate lower pressure outer jet 180. Inner nozzle 174 includes a cavitator 160, a spacer 164, and a nozzle plate 162 to alter the flow of high pressure water 114 and create cavitation cloud 138, while outer nozzle 178 has geometry appropriate to lower the pressure of water 114 for outer jet 180. That is, inner nozzle 174 defines an inner channel for cavitating jet 176, and an outer channel is for outer jet 180 defined between inner nozzle 174 and outer nozzle 178. In some examples, co-flow nozzle 122 may be separately supplied with lower pressure water in addition to high pressure water 114 from pump 112 as shown in FIG. 6.

Referring again to FIG. 7, as cavitation jet 176 and outer jet 180 leave co-flow nozzle 122, the outer jet forms a shell of water or fluid environment substantially surrounding the cavitation jet and resulting cavitation cloud 138. Abrasive media 140 is introduced by a wide-angle nozzle 168, and energized by the cloud. A portion of a rough surface 172 of workpiece 136 may be finished and peened by abrasive media 140 and cavitation cloud 138.

In some examples, apparatus 110 may be configured for use while fixed, or stationary. Workpiece 136 may be fully surrounded in cavitation cloud 138. Alternatively, workpiece 136 may be supported by a moving stage, to bring new portions of surface 72 into cavitation cloud 138 as surface finishing is completed. In other examples, apparatus 110 may be integrated into a wand or other movable structure, to allow an operator to direct nozzle 122 as desired.

In some examples, apparatus 110 may be appropriate for spot-treatment, or finishing of repair work. The apparatus may be configured for transport to a work-site, may include an adaptor or connector to accept pressurized water from a variety of external systems, or may be otherwise made portable. In other examples, apparatus 110 may be appropriate for use on large-scale projects, where it would be prohibitive to submerge workpieces in a tank of fluid.

Example 3

Figure 8A:
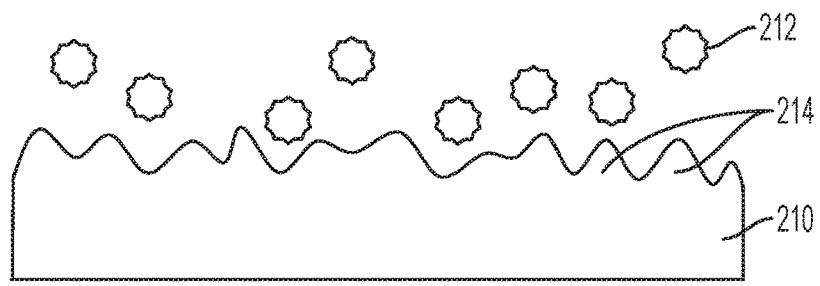
FIGS. 8A-8D are schematic diagrams of abrasive media of different sizes being used to remove surface roughness from a surface of a work piece.

FIGS. 8a-d illustrate a surface 210 undergoing a multi-stage fluid cavitation abrasive surface finishing process. In FIG. 8a, a first abrasive media 212 energized by a cavitation cloud interacts with protruding peaks 214 of surface 210, removing material from the surface and lowering the peaks.

Figure 8B:
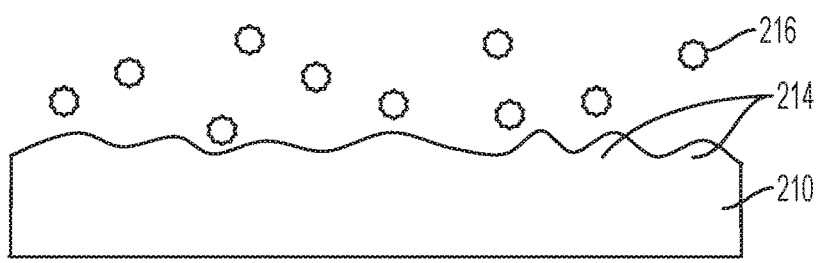
Figure 8C:
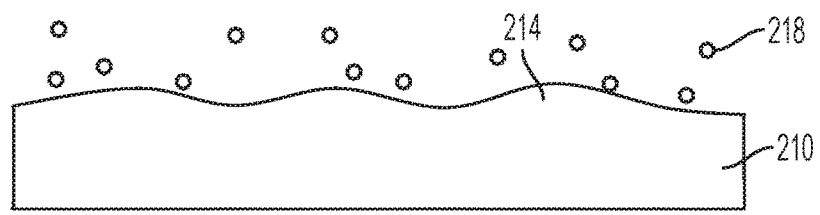
Figure 8D:

FIG. 8b shows a second abrasive media 216 interacting with surface 210, which has been smoothed to some extent. Second media 214 has a smaller grit size than first media 212, allowing the energized media to further smooth surface 210 and reduce protruding peaks 214. Similarly, a third abrasive media 218 removes additional material and further smooths surface 210, as shown in FIG. 8C. Finally, as shown in FIG. 8D, surface 210 has been finished to a desired level of smoothness. Any number of different media may be used for such a multi-stage process, in any number of stages.

Abrasive media 212, 216, 218 may include particles of any effective material, of any grit size, or may include a mixture of materials. For example, a media may include metal, glass, ceramic, silica oxide, aluminum oxide, pumice, nut shells, corn cob, or plastic abrasive particles. Each media may include particles preferably within a range of approximately 16 to 1200 ANSI grit size.

As previously discussed and shown in FIG. 3, abrasive media source 44 may be configured to deliver multiple abrasive media. Transition between media may be controlled by an operator or may be timed, actuated by a sensor, or otherwise triggered as part of an automatic multi-stage fluid cavitation abrasive surface finishing process.

A most effective combination of media may be selected from a plurality of materials available in source 44 based on the material and roughness of a particular surface to be finished. Alternatively, source 44 may be stocked with appropriate media for a particular surface at time of processing. For example, a metal surface with Ra 100 μM may be finished with glass abrasives of 100 and 500 grit sizes while a plastic surface with Ra 1,000 μM may be finished with nut shell abrasives of 10 grit size, and then pumice abrasives of 50 and 100 grit sizes.

Manner of Operation/Use

Figure 9:
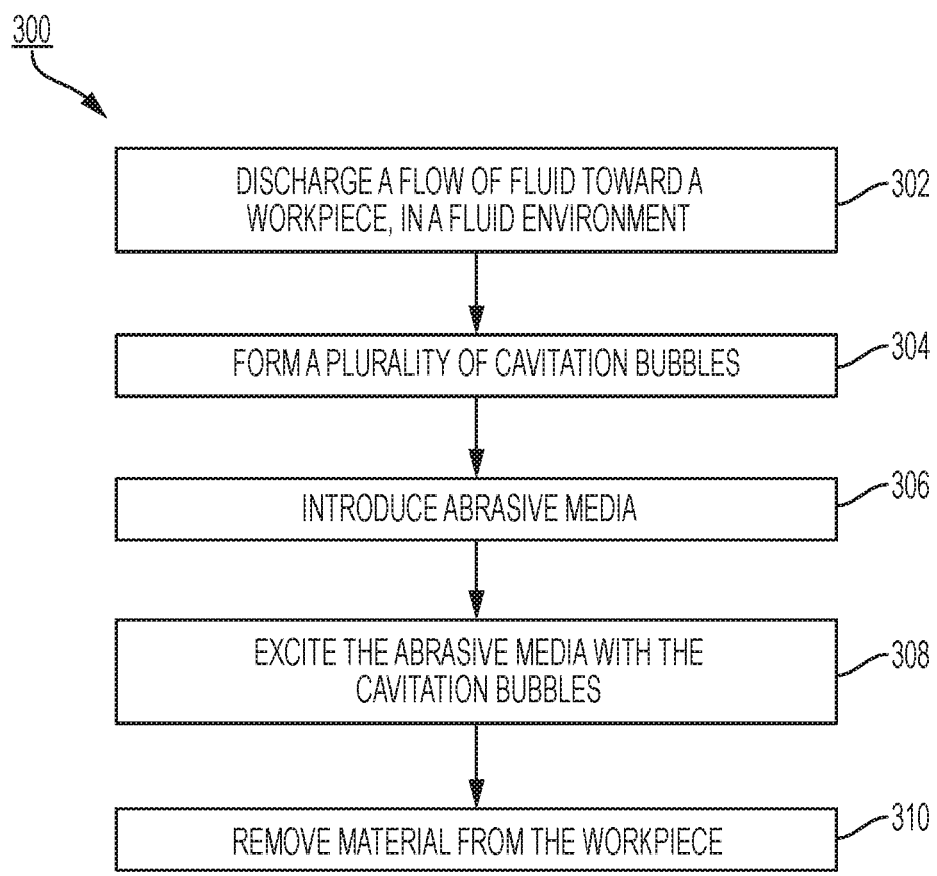
FIG. 9 is a flow chart illustrating a method of material removal.

FIG. 9 describes multiple steps of a method, generally indicated at 300, for surface finishing. Method 300 may be used in conjunction with any of the apparatuses, nozzles, or processes described in reference to FIGS. 1-8. Although various steps of method 300 are described below and depicted in FIG. 9, the steps need not necessarily all be performed, in some cases may be performed in a different order than the order shown, and in some cases may be performed simultaneously.

First step 302 of method 300 includes discharging a flow of fluid toward a workpiece, in a fluid environment. The fluid may be discharged at a pressure and a flow rate that facilitates step 304, which includes forming a plurality of cavitation bubbles. The fluid may be discharged from a nozzle, configured to alter pressure and flow rate in a manner that generates a cloud of cavitation bubbles.

The fluid may be discharged at a high pressure, preferably between 50 and 10,000 pounds per square inch. Either or both of the discharged fluid and the fluid environment may be water.

The fluid environment may be a body of fluid contained in a tank, and may also be under pressure. In such a case the workpiece may be submerged in the tank. Alternatively, discharging the flow of fluid may further include pumping a first fluid stream at a first pressure and a second fluid stream at a second, lower pressure. The first fluid stream may be contained by the second fluid stream, which may form the fluid environment.

Discharging the flow of fluid toward the workpiece may include surrounding the workpiece with the generated cloud of cavitation bubbles, or may include directing the flow to a portion of a surface of the workpiece. The workpiece may be supported by a stage, and the nozzle may be directed toward the stage or the workpiece.

Step 306 of method 300 includes introducing abrasive media into the plurality of cavitation bubbles. Introducing the abrasive media may form a mixture of cavitation bubbles and abrasive media that is directed toward the workpiece.

The abrasive media may be channeled through a conduit leading from a source, and may move through a corkscrew structure in the conduit. The media may then be dispersed through a wide-angle nozzle at a distal end of the conduit, the nozzle directed toward cavitation bubbles. The conduit may rotate or otherwise move as the abrasive media is introduced. The abrasive media source may be pressurized to induce movement of the abrasive media through the conduit. In some examples, abrasive media may be channeled through multiple conduits from the abrasive media source or from multiple sources.

The abrasive media may include particles of one or more of metal, glass, ceramic, silica oxide, aluminum oxide, pumice, nut shells, corn cob, and plastic abrasives. Preferably, the included particles may be within a dimensional range of approximately 16 to 1200 ANSI grit size. Any effect abrasive media, combination of media, or mixture of media or particles may be used. In some examples, step 306 of introducing abrasive media may be repeated for a series of abrasive media with descending grit sizes.

Step 308 includes exciting the abrasive media with the cavitation bubbles. The cavitation cloud formed by the cavitation bubbles may have a swirling, vortex motion that imparts speed, momentum, and kinetic energy to the abrasive media. The cavitation bubbles may also collapse, collectively accelerating the motion of the abrasive media to achieve a high speed and sufficient kinetic energy to remove material from a surface of the workpiece upon impact, thereby facilitating step 310 of method 300 which includes removing material from the workpiece.

Since the cavitation cloud and bubbles impart a swirling and multi-directional motion to the abrasive media, material may be removed from tight corners, crevices, and internal features of the workpiece. The cavitation bubbles may further perform cavitation peening and cleaning of the surface of the workpiece.

Additional Examples

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A method of material removal, comprising:
discharging a flow of fluid towards a workpiece at a pressure and a flow rate that facilitates forming a plurality of cavitation bubbles,
introducing abrasive media into the plurality of cavitation bubbles,
exciting the abrasive media with the cavitation bubbles, and removing material from the workpiece based on an interaction between the cavitation bubbles with the abrasive media and the surface of the workpiece.

A1. The method of A, wherein the method is carried out in a fluid environment.

A2. The method of A1, wherein the fluid environment is a body of fluid contained in a tank.

A3. The method of A1, wherein the discharging step includes pumping a first fluid stream at a first pressure level, the fluid environment comprising a second stream of fluid surrounding the first stream at a second pressure level, the second pressure level being lower than the first pressure level.

A4. The method of A, wherein the fluid comprises water.

A5. The method of A, wherein the introducing step includes channeling abrasive media from a source into the plurality of cavitation bubbles.

A6. The method of A, wherein the abrasive media includes particles comprising one or more of (a) metal, (b) glass, (c) ceramic, (d) silica oxide, (e) aluminum oxide, (f) pumice, (g) nut shells, (h) corn cob, and (i) plastic abrasives.

A7. The method of A, wherein the abrasive media includes particles in a dimensional range of approximately 16 to 1200 ANSI Grit Size.

A8. The method of A, further comprising
channeling the abrasive media through a conduit leading from a source of the abrasive media to the plurality of cavitation bubbles.

A9. The method of A8, further comprising:
rotating or otherwise actuating movement of the conduit during the introducing step.

A10. The method of A9, further comprising:
moving the abrasive media through a corkscrew structure in the conduit.

A11. The method of A8, further comprising:
dispersing the abrasive media through a wide angle nozzle at a distal end of the conduit.

A12. The method of A, further comprising:
channeling the abrasive media through plural conduits into the plurality of cavitation bubbles.

A13. The method of A, wherein the discharging step is performed at a pressure in a range of 50 to 10,000 pounds per square inch.

B. A method of material removal, comprising:
forming a mixture of cavitation bubbles and abrasive media, and
removing material from a surface on a workpiece by directing the mixture toward the surface.

B1. The method of B, comprising:
discharging a fluid at high pressure through a nozzle directed toward the workpiece, and
introducing abrasive media into cavitation bubbles generated by the discharging step.

B2. The method of B1, wherein the introducing step includes dispersing the abrasive media through a wide angle nozzle directed toward the cavitation bubbles.

C. An apparatus for removing material from workpiece, comprising:
a fluid flow device configured to pump fluid through a nozzle generating a plurality of cavitation bubbles directed toward a workpiece, and
an abrasive media dispensing device configured to deliver abrasive media into cavitation bubbles generated by the fluid flow device.

C1. The apparatus of C, further comprising:
a tank for containing a body of fluid, and
a stage for supporting a workpiece in the body of fluid, the fluid flow device being directed toward the stage.

C2. The apparatus of C, wherein the fluid flow device includes a nozzle having an inner channel configured to supply a first stream of fluid at a first pressure level sufficient to generate a plurality of cavitation bubbles, and an outer channel configured to supply a second stream of fluid at a second pressure level, the second pressure level being below the first pressure level, and wherein the second stream of fluid substantially surrounds the first stream of fluid.

Advantages, Features, Benefits

The different embodiments of the methods and apparatuses for surface finishing described herein provide several advantages over known solutions for finishing material surfaces. For example, the illustrative embodiments of the method described herein allow finishing of complex, irregularly shaped surfaces. Additionally, and among other benefits, illustrative embodiments of the method described herein allow a surface to be smoothed, cleaned, and peened with one process. No known system or device can perform these functions, particularly for such a wide range of surface shapes and materials. Thus, the illustrative embodiments described herein are particularly useful for finishing parts produced by additive manufacturing. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A method of material removal, comprising:
discharging a flow of fluid from a nozzle towards a workpiece at a pressure and a flow rate that facilitates forming a plurality of cavitation bubbles downstream and outside the nozzle,
introducing abrasive media downstream of the nozzle, into the plurality of cavitation bubbles,
exciting the abrasive media with the cavitation bubbles, and removing material from the workpiece based on an interaction between the cavitation bubbles with the abrasive media and a surface of the workpiece.

2. The method of claim 1, wherein the method is carried out in a fluid environment.

3. The method of claim 2, wherein the fluid environment is a body of fluid contained in a tank.

4. The method of claim 1, wherein the discharging step includes discharging a first fluid stream at a first pressure level and a second stream of fluid surrounding the first stream at a second pressure level, the second pressure level being lower than the first pressure level.

5. The method of claim 1, wherein the fluid comprises water.

6. The method of claim 1, wherein the introducing step includes channeling abrasive media from a source into the plurality of cavitation bubbles.

7. The method of claim 1, wherein the abrasive media includes particles comprising one or more of (a) metal, (b) glass, (c) ceramic, (d) silica oxide, (e) aluminum oxide, (f) pumice, (g) nut shells, (h) corn cob, and (i) plastic abrasives.

8. The method of claim 1, wherein the abrasive media includes particles in a dimensional range of approximately 16 to 1200 ANSI Grit Size.

9. The method of claim 1, further comprising
channeling the abrasive media through a conduit leading from a source of the abrasive media to the plurality of cavitation bubbles.

10. The method of claim 9, further comprising:
rotating or otherwise actuating movement of the conduit during the introducing step.

11. The method of claim 10, further comprising:
moving the abrasive media through a corkscrew structure in the conduit.

12. The method of claim 9, further comprising:
dispersing the abrasive media through a wide angle nozzle at a distal end of the conduit.

13. The method of claim 1, further comprising:
channeling the abrasive media through plural conduits into the plurality of cavitation bubbles.

14. The method of claim 1, wherein the discharging step is performed at a pressure in a range of 50 to 10,000 pounds per square inch.

15. A method of material removal, comprising:
discharging a first stream of fluid and a second stream of fluid through a nozzle, the first stream of fluid having a higher pressure than the second stream of fluid and the second stream of fluid surrounding the first stream of fluid wherein the discharging facilitates forming a plurality of cavitation bubbles downstream and outside the nozzle,
forming a mixture of cavitation bubbles and abrasive media by introducing abrasive media downstream of the nozzle into the cavitation bubbles generated by the discharging step, and
removing material from a surface on a workpiece disposed in an air environment by directing the mixture toward the surface.

16. The method of claim 15, wherein the forming step includes dispersing the abrasive media through a wide angle nozzle directed toward the cavitation bubbles.

17. An apparatus for removing material from a workpiece, comprising:
a fluid flow device that pumps fluid through a first nozzle generating a plurality of cavitation bubbles downstream and outside the first nozzle, wherein the cavitation bubbles are directed toward the workpiece, and
an abrasive media dispensing device that delivers abrasive media through a second nozzle into the cavitation bubbles outside the first nozzle generated by the fluid flow device, such that the abrasive media is delivered between the first nozzle and the workpiece.

18. The apparatus of claim 17, further comprising:
a tank for containing a body of fluid, and
a stage for supporting the workpiece in the body of fluid, the fluid flow device being directed toward the stage.

19. The apparatus of claim 17, wherein the first nozzle has an inner channel configured to supply a first stream of fluid at a first pressure level sufficient to generate a plurality of cavitation bubbles, and an outer channel configured to supply a second stream of fluid at a second pressure level, the second pressure level being below the first pressure level, and wherein the second stream of fluid substantially surrounds the first stream of fluid.

20. The apparatus of claim 17, wherein the fluid comprises water.

21. The apparatus of claim 17, wherein the conduit includes a corkscrew structure.

22. The apparatus of claim 17, wherein the second nozzle is a wide angle nozzle directed toward the cavitation bubbles.

* * * * *